Figure 1:
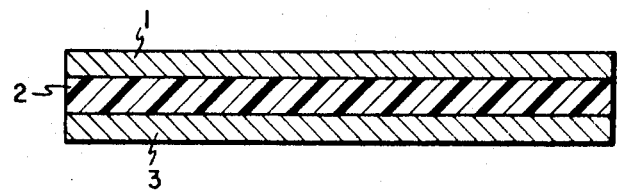

United States Patent
Hartman et al.

[15] 3,652,360
[45] Mar. 28, 1972

[54] METHOD FOR MANUFACTURING MASS PARTICLES IN A VISCOELASTIC MATRIX

[72] Inventors: Seymour Hartman, Mahopac, N.Y.; Francis F. Sullivan, Santa Barbara, Calif.

[73] Assignee: U.S. Plywood-Champion Papers Inc., New York, N.Y.

[22] Filed: Jan. 23, 1969

[21] Appl. No.: 793,317

Related U.S. Application Data

[60] Division of Ser. No. 455,247, May 12, 1965, Pat. No. 3,424,270, Continuation-in-part of Ser. No. 317,204, Oct. 18, 1963, abandoned.

[52] U.S. Cl............................156/244, 156/281, 156/333, 161/162, 161/216, 161/401, 181/33 A, 181/33 G
[51] Int. Cl...................B29f 3/02, B32b 15/08, B32b 15/16
[58] Field of Search..................161/162, 168, 216; 156/244, 156/281, 333; 181/33.01, 33.1

[56] References Cited

UNITED STATES PATENTS

| | | | |
|---|---|---|---|
| 3,056,707 | 10/1962 | Helbing et al.............................. | 181/33 |
| 3,117,054 | 1/1964 | Antonucci.............................. | 161/162 |
| 3,253,947 | 5/1966 | McCluer et al........................... | 181/33 |

FOREIGN PATENTS OR APPLICATIONS

| | | | |
|---|---|---|---|
| 604,197 | 8/1960 | Canada..................................... | 181/33 |
| 810,661 | 10/1951 | Germany................................. | 181/33 |

OTHER PUBLICATIONS

Becker, Acustica Vol. 11 (1961) pp. 264–269

Primary Examiner—John T. Goolkasian
Assistant Examiner—George W. Moxon, II
Attorney—James M. Heilman

[57] ABSTRACT

The present invention is broadly concerned with the method of manufacture of a novel composition of matter which possesses the physical properties of mass and viscoelasticity for the preparation of high quality acoustical structural units as, for example, a panel, a wall, a ceiling, a floor, or any partition wherein it is desired that it possess high acoustical or a high sound transmission loss in high quality stereo speaker enclosures and in X-ray and radiation shielding.

4 Claims, 5 Drawing Figures

PATENTED MAR 28 1972 3,652,360

SHEET 1 OF 3

INVENTORS
FRANCIS F. SULLIVAN
Seymour Hartman

James M. Heitman
ATTORNEY

FIG. 4
FIG. 5
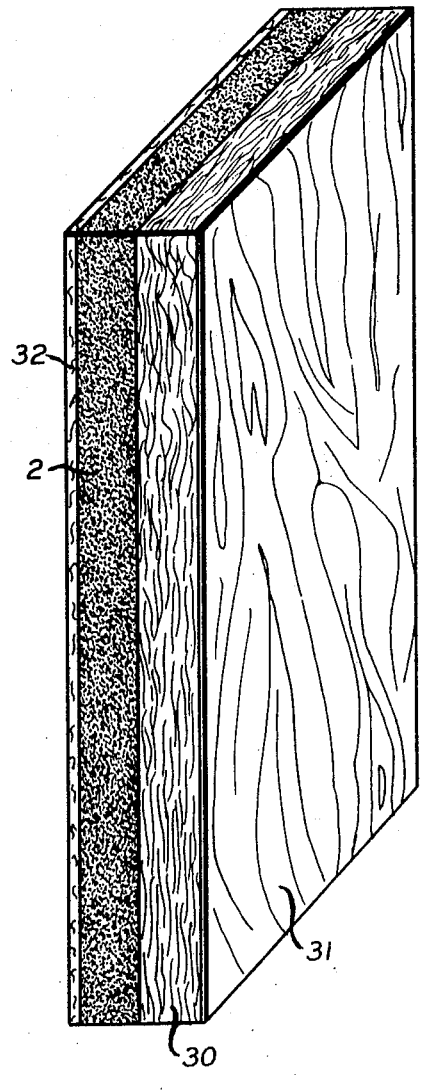
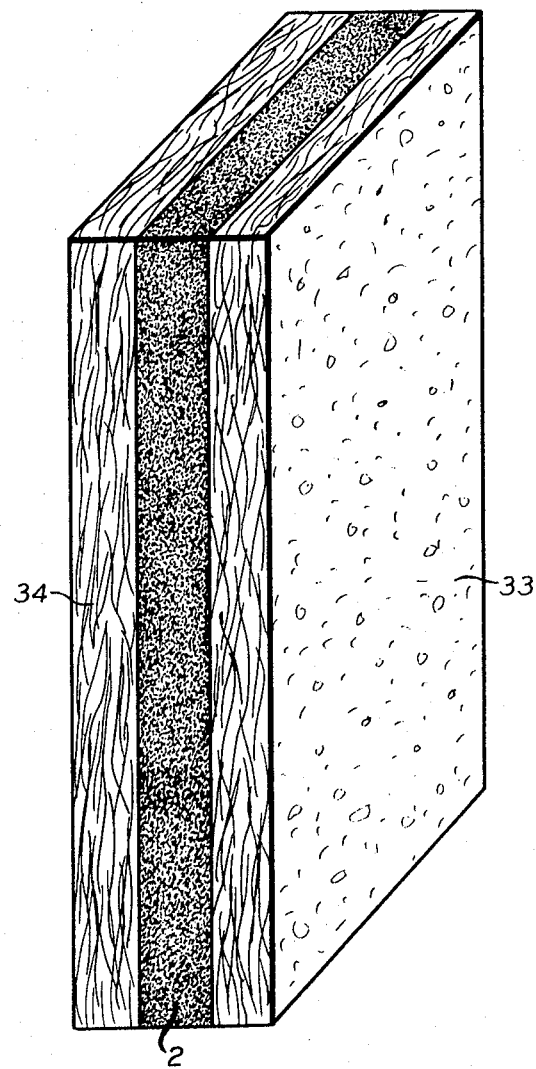
INVENTORS
FRANCIS F. SULLIVAN
SEYMOUR HARTMAN
James M. Heitman
ATTORNEY.

METHOD FOR MANUFACTURING MASS PARTICLES IN A VISCOELASTIC MATRIX

CROSS REFERENCES TO RELATED APPLICATIONS

This application is a division of Application Ser. No. 455,247, filed May 12, 1965, granted as U.S. Pat. No. 3,424,270, on Jan. 28, 1969, which later application is a continuation-in-part of application Ser. No. 317,204, filed Oct. 18, 1963 (now abandoned).

The present invention is broadly concerned with a process for producing a novel composition of matter which possesses the physical properties of mass and viscoelasticity. This application is a division of application Ser. No. 455,247, filed May 12, 1965, granted as U.S. Pat. No. 3,424,270, on Jan. 28, 1969, which later application is a continuation-in-part of application Ser. No. 317,204, filed Oct. 18, 1963 (now abandoned).

The invention is further concerned with the methods and application of these materials or compositions possessing both mass and viscoelasticity for the preparation of high quality acoustical structural units as, for example, a panel, a wall, a ceiling, a floor, or any partition wherein it is desired that it possess high acoustical or a high sound transmission loss, and in X-ray and radiation shielding.

Such a composition of matter which comprises mass in a viscoelastic matrix will also find use in the manufacturing of high quality stereo speaker enclosures; whereby proper response of either very low and very high frequencies can be achieved. This viscoelastic mass is incapable of resonating, no matter how strong the bass backwave is projected against it. Optimum results are achieved with the very low frequency range since all vibrations are dampened.

In particular, the composition made by the present invention comprises a high density viscoelastic material which functions, when incorporated in an acoustical structural unit, to provide an exceptionally high acoustical sound barrier.

It is known in the art that sound or sound waves are blocked or attenuated by mass or weight of a structural element. Generally speaking, the greater the mass or weight per unit area of the structural element such as mass per square foot, the greater will be the sound transmission loss or the greater the sound attenuation on the other side of the element. On the other hand, it is also known in the acoustic art that the weight or mass is fully effective only if the panel is perfectly "limp." When the panel is limp and the sound waves strike the structural element, the resulting motion is localized and the sound spreads quite slowly. Thus, the acoustical efficiency with respect to attenuation of sound waves of any material depends not only on its weight per unit area, but also on its "bending stiffness." If a panel or structural element is too stiff or too rigid, it will actually lose much of its attenuation characteristics which it gains by having a relatively high mass per unit area. Thus, to attain an ideal system for acoustical barriers, it is necessary that the attenuation unit have both high weight or mass per unit area and also have bending stiffness (limpness). Limpness in the present application will be referred to as viscoelasticity.

The composition of the present invention of a high density and viscoelastic material is utilized to produce structural units having high acoustical attenuation or which produces a very high sound transmission loss. The composition of the present invention is obtained by utilizing a solid material as an inorganic filler. The preferred solid material comprises barium sulfate which has an overall specific gravity of about 4.5. The solid material such as the preferred barium sulfate is homogeneously dispersed in a viscoelastic binder.

Barium sulphate is particularly important because of its availability and cheapness. For example, while the cost of lead ranges from about 15 to 18 cents per pound, barium sulphate ranges from 1 to 2 cents per pound.

While barium sulphate is greatly preferred, other dense materials may be used providing they possess a specific gravity preferably above 4.0 or at the minimum above 3.0.

Compounds of elements which fall into this category possess one or more of the following anionic moieties, the sulfide, the oxide, the carbide, the iodide, the boride, the selenide, the chloride, the silicide, the teluride, the carbonate and/or the sulfate. One or more of the above mentioned anionic groups of the following elements (listed below), possess a density of 4 or more:

| | | | | |
|---|---|---|---|---|
| Vanadium | Zirconium | | | |
| Tantalium | Aluminum | Cerium | Lead | Osmium |
| Tellurium | Antimony | Chromium | Magnesium | Palladium |
| Thallium | Arsenic | Copper | Manganese | Platinum |
| Thorium | Barium | Europium | Molybdenum | Rhodium |
| Tin | Bismuth | Callium | Neodymium | Silver |
| Tungsten | Calcium | Indium | Nickel | Sodium |
| Zinc | Cadmium | Iron | Niobium | Strontium |

Of the foregoing, preferred substances are lead sulfide, lead iodide, thorium boride, lead carbonate and strontium carbonate. Other good substances are iron carbonate and iron boride.

While relatively large particles of solid filler may be embedded throughout the mass of the binder as, for example, particles which pass through about 100 mesh screen, it is preferred that the particles utilized be relatively fine as, for example, a mass of particles wherein at least 90 percent pass through a 250 mesh screen, and preferably a mass of particles wherein at least 90 percent pass through a 325 mesh screen. When relatively fine particles are used, a very high quality acoustical panel is secured. This solid material added to the binder as mentioned should have specific gravity at least of 3.0 and preferably not less than about 4.0.

The viscoelastic binder components of the described sound blocking composition of the present invention may be any thermoplastic and/or modified flexible thermosetting resin which can be formulated with a high concentration by weight of barium sulfate, or other satisfactory substance as described, and others with similar specific gravities to yield an end viscoelastic material of high density. Materials or resins which are preferred are, for example, polyvinyl chloride, polyisobutylene, all natural and synthetic rubbers, polysulfides, flexible phenolies, polyurethanes (flexible), polyvinyl butyral, polyethylene-polyvinyl acetate copolymers, acrylonitrile rubbers, asphalt, tar, and combinations of the foregoing materials.

This high density and viscoelastic composition which is utilized for the production of acoustical structural units having a high degree of sound transmission loss is obtained by evenly and uniformly distributing the barium sulfate, or other high density material, or other similar materials with similar specific gravities within the viscoelastic binder, preferably under high shear. One technique or process for the manufacture of the composition of the present invention is to uniformly mix the barium sulfate in a viscoelastic binder under high shear by mixing in a unit as, for example, a Banbury Mill or on a "three-roll mill" or any other type of high shear mixing unit.

In general, it is preferred that the acoustical barium composition of the invention have a mass per square foot in the range from about 0.5 lbs. to 20 lbs. per square foot, depending upon the sound transmission loss desired. A preferred range is from about 3 to 12 or 14 lbs./sq.ft. In general, the amount of barium sulfate, or other high specific gravity material, present in the sound blocking component is in the range from about 50 to 95 percent, preferably in the range of about 70 to 90 percent by weight as compared to from about 5 to 50 percent or 10 to 30 percent by weight of the viscoelastic binder or matrix. A very desirable concentration of barium sulfate is about 85 percent by weight.

After a homogeneous blend of the filler such as barium sulfate is secured in the viscoelastic binder, the blend or sound blocking composition is cured at a temperature in the range from about 150° to 350° F., preferably at about 275° to 330° F. for a time period in the range from about 15 minutes to 2 hours, preferably for a time period from about 1 to 1½ hours.

It is to be understood that the temperature of curing as well as the time of curing is dependent upon the thickness of the composition desired as well as upon the binder used and also upon the weight per square foot.

It is preferred that the slabs be cured under pressure in the range from about 100 to 2,000 lbs. per square inch. After curing of the high mass viscoelastic composition comprising barium sulfate in a binder, the material can then be used as a core material for the manufacture of structural units which possess high sound transmission losses.

The present invention may be more readily understood by reference to the drawings illustrating embodiments of the same.

Figure 2:
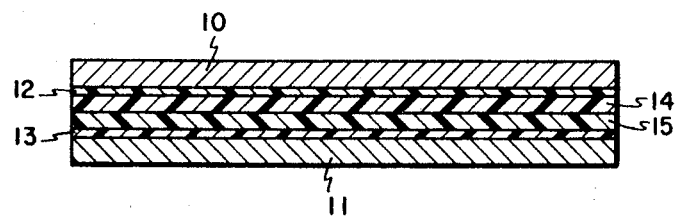
Figure 3:
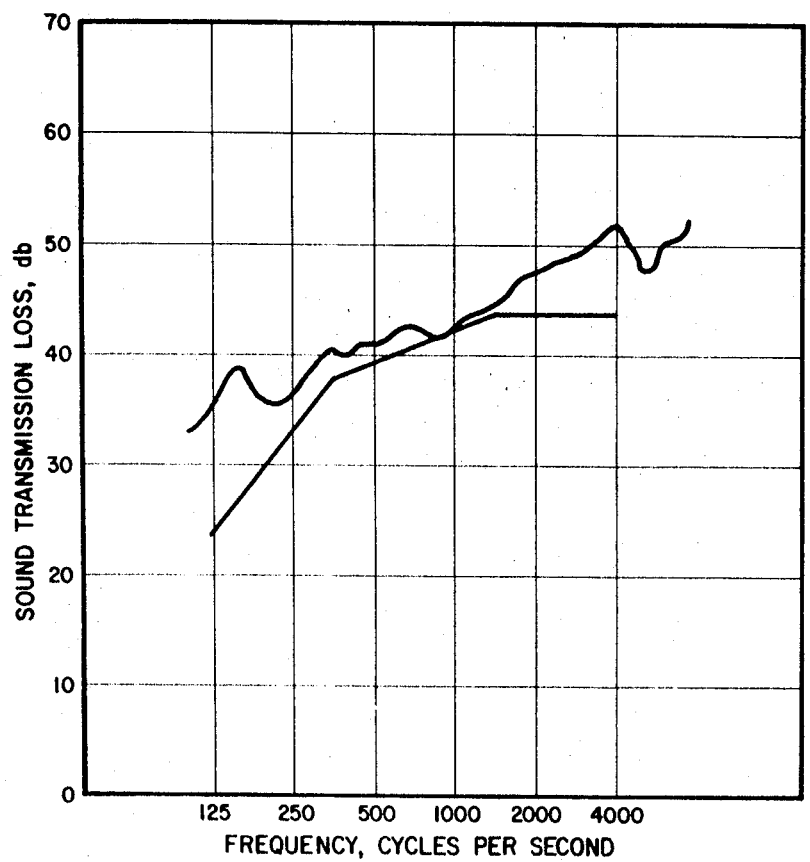

FIG. 1 illustrates a single core structural element.
FIG. 2 illustrates a laminated core structure.
FIG. 3 illustrates sound transmission loss of test specimens.
FIG. 4 is a modified construction; and
FIG. 5 is a further modified construction.

Referring specifically to FIG. 1, the composition is employed as a core material 2 between two face panels 1 and 3 to produce an acoustical structural unit having a high sound transmission loss. Face panels 1 and 3 are of any material such as metal, asbestos, cement-asbestos, solid wood, wood veneer, hardboard, plywood, etc., which functions as a front and back face of a structural unit, such as a door, a partition, a panel, a wall, a floor, or the like. The thickness of these panels may be of any desired thickness, as for example, from one-fourth to 1 inch in thickness. Generally, it is preferred that if these panels are wood, they comprise about three plies. For example, the homogeneous blended slab 2, employed here as the core component, comprises the composition of a high percent by weight of barium sulfate uniformly distributed in a viscoelastic binder. The thickness of the core may vary appreciably depending upon other factors such as its use, the other dimensions, and the degree to which it is desired to cause sound transmission loss. Generally, the thickness of the core will be in the range from about one-sixteenth to 3 inch, preferably in the range from about one-fourth to 1 inch for wall panels. Preferred overall thickness including the faces are from about three-fourths to 2.5 inches.

The viscoelastic binder may be any thermoplastic and/or modified flexible thermosetting resin, with preference for the thermoplastic. One of these thermoplastic resins which can be utilized in the manufacturing of the viscoelastic products is polyvinyl chloride.

Polyvinyl chloride is the preferred resin to use as a binder in the manufacture of this novel core composite. Since the binder is thermoplastic, the fabrication of the core can take place in a press, such as a roller press or a flat platen press, or preferably can be extruded in sheet form or in any other desired profile form.

It is desirable to extrude the composite material from a dry blend composite. Further, it is more preferred to use a resin which will accept the required amount of plasticizers and still maintain its dryness after dry blending in all the ingredients.

A dry blend composite of the following formula to be used to manufacture the viscoelastic core by extrusion was prepared, for example, as follows:

| | Parts by weight |
|---|---|
| Polyvinyl chloride (dry blending resin) | 100 (90–110) |
| Barium sulfate filler | 900 (800–1000) |
| Dioctyl phthalate (plasticizer) | 120 (110–130) |
| Vinyl stabilizer | 2.5 (2–3) |
| Stearic acid (lubricant) | 1. (.5–1.5) |

The dry blend of the above formula was prepared approximately as follows:

In conventional blending equipment, for example, "Ribbon" blender, "Henschel" mixer or "Papenmeier" mixer, which contain facilities for heating and cooling, is added the filler and resin. The blending machine is turned on and the filler and resin are blended. The plasticizer (DOP) and stabilizer are added, and the composite is mixed for 5 minutes after which time the blender is heated with steam to approximately 195° F. – 220° F. At this temperature stearic acid is added and the steam is cut off. The blender is cooled to 100° F. The dry blend composite is then removed and can be extruded in a conventional extruder containing the proper sheet or profile die and the proper screw. By controlling the temperature at the various extruder zones and at the die, the viscoelastic material core can be sheet or profiled extruded. Hence, this is one method of manufacturing the core material in any desired configuration.

In order to further illustrate the invention, a number of operations were carried out in which high sound transmission loss panels were prepared employing the sound dampening or sound blocking compositions hereinbefore described. These operations are described in the following examples.

EXAMPLE 1

The following composition produced a high density viscoelastic material which, when fabricated into a core material as described, produced a panel having high sound transmission loss characteristics.

| | Parts by Weight |
|---|---|
| Polyvinyl chloride | 400 |
| Plasticizers (1) | 410 |
| Kenflex A(2) | 200 |
| Celluflex 23(3) | 20 |
| Barium Sulfate | 5200 |
| | 6230 |

(1). Tricresyl phosphate 170 Dioctyl phthalate 120 Diiso-octyl phthalate 120

(2). Synthetic polymer of aromatic hydrocarbons $(CH_3)_2 C_{10}H_5 - CH_2-C_{10}H_4 (CH_3)^2 -CH_2-C_{10}H_5 (CH_3)_2$ Avg. mol. wt. - 662 Melting point - 160

(3). Alkyl epoxy stearate (4.5% oxirane oxygen)

The base plastisol was made up in a Hobart mixer. One-half the amount of plasticizers was placed in the Hobart mixer, and while being stirred the vinyl resin was added slowly. After homogeneous blending of the resin in the plasticizers, melted Kenflex A was added while being stirred. The inorganic barium sulfate was also added slowly while being stirred and the other half of the plasticizers was added as needed.

After admixing the above components the mass was milled two times on a three-roll mill to obtain a homogeneous mass. This material was then cured in slab forms at 327° F. for 1 hour to yield the viscoelastic dense sound blocking component employed as the core of a panel structure. Contact adhesives were coated on the two surfaces of this core structure as well as on two faces of the panels. When the contact cement was dried the high density viscoelastic core material was placed between the two outer face panels and run through a nip roll to make contact.

EXAMPLE 2

Another composition prepared as described is as follows:

| | Parts by Weight |
|---|---|
| Powdered Nitrile Rubber | 200 |
| Polyvinyl Chloride | 150 |
| Plasticizer | 200 |
| Stabilizer (vinyl)(1) | 5 |
| Barium Sulfate | 1500 |
| | 2055 |

(1) Barium cadmium stabilizer

The resinous components were blended as in Example 1 in the plasticizers and milled on a three-roll mill. The milled mass was placed between two sheets of plywood and compressed to a thickness of 1 inch and held between the press at 300° F. for 15 minutes. If more viscoelasticity is desired, then addition of more plasticizer is required.

EXAMPLE 3

Another composition prepared as described is as follows:

|  | Parts by Weight |
| --- | --- |
| Natural rubber | 100 |
| Zinc Oxide | 5 |
| Stearic Acid | 2 |
| Amax(1) | 1 |
| Methyl Zimate | 0.25 |
| Sulfur | 0.75 |
| Reogen(2) | 5 |
| Barium Sulfate | 570 |
|  | 684 |

(1). N-oxydiethylene benzothiazele-2-sulfenamide.

(2). Mixture of oil soluble sulfonic acid of high molecular Weight with a paraffin oil.

The above components were milled on a Banbury Mill according to the usual methods employed in the rubber industry.

Slabs were then made and cured for about 30 minutes at 307° C. in the press under pressure ranging from 880 to 2,000 lbs. or 200 to 800 p.s.i.

Also, variation in viscoelastic properties can be obtained in the foregoing example by (1) reducing the sulfur content, and (2) by employing plasticizers.

EXAMPLE 4

Other slabs of the core composition described in Example 3 were prepared as follows: After milling on a Banbury Mill, two ⅛ inch sheets of the above-formulated material was calendered into 4 × 8 feet × ⅛ inch sheets. These two sheets were cured separately as described under similar conditions. Two other 4 × 8 feet × ¼ inch sheets were calendered from the same formulated stock and placed one on top of the other giving a 4 × 8 feet × ½ inch uncured slab.

To this 4 × 8 feet × ½ inch uncured slab was laminated on the top and bottom using rubber contact cement, the two cured 4 × 8 feet × ⅛ inch, thereby making up a laminated composition or structure consisting of a top 4 × 8 feet × ⅛ inch cured high specific gravity viscoelastic material, followed by an intermediate 4 × 8 feet × ½ inch uncured high specific gravity viscoelastic composition and finally a lower 4 × 8 feet × ⅛ inch cured high specific gravity viscoelastic composition. This constructure is preferred for some uses because of its exceedingly high and unobvious damping effects.

This laminated composition comprises the core used in making up an acoustical panel secured by affixing two panels, such as, three-ply plywood, on the top and bottom using contact cement. The described acoustical panel is illustrated in FIG. 2 wherein 10 and 11 are the two face panels of plywood or other material. The cured core laminated ⅛ inch layers or sheets are shown as 12 and 13 while 14 and 15 show the double ¼ inch sheets of the uncured composition. The resulting panel had a thickness of about 1¾ inch.

This panel manufactured as described was sent to Riverbank Acoustical Laboratories located at Geneva, Illinois and tested for its acoustical properties; namely, its sound transmission loss.

The results of these tests* were as follows:

| A. Nine frequency average | 42 |
| --- | --- |
| B. Sound transmission class | 44 |

A curve plotting the mine frequency results and sound transmission class is given in FIG. 3.

The method used in making these measurements meets explicitly both the American Society for Testing and Materials Designation: E 90–61 T and the American Standard Recommended Practice: Z 24.19–1957 for the measurement of airborne sound transmission loss.

The experimental panel, 1½ thick by 44 wide by 84 inches high, was mounted in a frame made of 2 by 6 inches lumber, using a P-gasket on one side and solid wood steps on the opposite side. The specimen consisted of a ⅜ inch plywood on each side of a core containing four layers of a proprietary material. The frame

* These tests were conducted as described in their publication entitled "Special Report — Sound Transmission Class: An Explanation," 5th Edition, dated 6/15/62; and in their publication entitled "The Measurement of Airborne Sound Transmission Loss" dated May, 1963.

was set into a 16 inches thick dense concrete filler wall of known transmission loss, which had been built in the source room opening. The specimen, less frame, weighed 341 lbs., an average of 13.3 lbs. per sq. ft. The transmission area, S, used in the computations was 25.6 sq. ft.

The sound transmission loss of a specimen (TL) is the ratio, expressed in decibels, of the incident sound power on the source side of the specimen to the transmitted sound power on the receiving side when the sound fields on both sides of the specimen are diffused. The curve in the accompanying graph, FIG. 3, is the sound transmission loss of the test specimen as derived from the measurement. The broken line is the sound transmission class contour. Sound transmission loss values are tabulated at eleven frequencies. The sound power transmitted by the filler wall was calculated and found to make no significant change in the measured results as reported to the nearest decibel.

The nine-frequency arithmetic average, which excludes the values at 1,400 and 2,800 c.p.s. is given for comparison with previous data and for dealing with specifications still based on this index. A preferred criterion, based on actual partition requirements in typical architectural applications, is the sound transmission class.

A straight line can be drawn between the two check marks on the edges of the grid to locate the theoretical transmission loss of a limp mass with the same weight per sq. ft. as the specimen. This is given by the equation $TL = 20 \log W + 20 \log F - 33$, where $W$ is the weight in lb. per sq. ft. and $F$ is the frequency in c.p.s.

In essence, the sound transmission loss measurements were made in accordance with applicable standards of the American Society for Testing and Materials, and the American Standards Association, Inc. identified as follows:

Tentative Recommended Practice for LABORATORY MEASUREMENT OF AIRBORNE SOUND TRANSMISSION LOSS OF BUILDING FLOORS AND WALLS, ASTM Designation: E 90–61 T.

American Standard Recommended Practice with the same title, Z24.19–1957.

Tentative method of Test for SOUND ABSORPTION OF ACOUSTICAL MATERIALS IN REVERBERATION ROOMS. ASTM Designation: C 423–60T.

American Standard PREFERRED FREQUENCIES FOR ACOUSTICAL MEASUREMENTS, S1.6–1960.

American Standard ACOUSTICAL TERMINOLOGY, S1–1–1960.

It is to be understood that while a laminated component or panel such as described in Example 4 is very desirable, a component or panel can be manufactured solely from a totally curved viscoelastic mass and then coated with a paint, vinyl film or vinyl sheet, or wood veneer, etc.

Various other types of laminated products may be made, such as illustrated in FIG. 4 wherein the dense viscoelastic core is backed on one side with mineral fibers, acoustical plaster, cellulose fibers, particle board, etc. 30 to which a thin facing of vinyl film or decorative wood veneer 31 is bonded. On the reverse side, there is laminated plasterboard, hardboard, plywood 32, etc.

Likewise, FIG. 5 illustrates different types of backing or facing materials such as absorbent fibrous material or acoustical plaster 33, and particle board or insulation board 34. Obviously, the core could be laminated with cured and uncured plies as illustrated in FIG. 2 if desired.

EXAMPLE 5

Another composition in accordance with the present invention is as follows:

| | |
|---|---|
| Vinyl resin (1) | 50 |
| Nycar 1411 (2) | 43 |
| Nycar 1312 (3) | 100 |
| Paraplex G50 (4) | 45 |
| Stearic acid | 1 |
| Zinc oxide | 5 |
| Sulfur | 2 |
| Aluminum oxide (filler) | 700 |
| | 946 |

(1). Exemplified by trademarks GEON of B.F. Goodrich, MARVINOL of U.S. Rubber, and OPALON of Mansanto. A polyvinyl chloride resin (used for plastisol formulations). Specific viscosity 0.50 – 0.53; specific gravity —1.4; particle size (micron 1 – 7)

(2). Trademark of B.F. Goodrich Chemical Company for their copolymer of butadiene and acrylonitrile of high acrylonitrile content. Specific gravity of 1.0. Average mooney viscosity = 115.

(3). Trademark of B.F. Goodrich Chemical Company for their copolymer of butadiene and acrylonitrile of medium – high acrylonitrile content. A liquid (100 percent solid) with a specific gravity = 0.98.

(4). A trademark of Rohm & Haas, to describe their general purpose, polyester polymeric plasticizer.

| | |
|---|---|
| Specific gravity | 25°C / 15°C =1.08 |
| Viscosity poises | 25°C / 1 = 23 |
| Refractive index | N 25/0 = 1.466 |
| Average molecular weight | 2200 |
| Acid number | 2.0 (max.) |
| Saponification number | 500 |

In compounding Nycar 1411 was mixed with Paraplex G50 on a Hobart Mixer. The vinyl resin was added and the filler then was added slowly. The mass was transferred to a Baker Perkins Mill and blended for 1 hour, during this time stearic acid and zinc oxide were added. Sulfur was added toward the end of the mixing time.

The sample was cured in a press for 10 minutes at 310° F. A combination of the above listed compounds can be employed as fillers as exemplified in Example 6, as follows:

EXAMPLE 6

| | |
|---|---|
| Vinyl resin | 50 |
| Hycar 1411 | 43 |
| Hycar 1312 | 100 |
| Paraplex G50 | 50 |
| Dibutyl Phathlate | 35 |
| Zinc Oxide | 5 |
| Stearic acid | 1 |
| Sulfur | 2 |
| Antimony oxide (filler) | 725 |
| Barium sulfate (filler) | 700 |
| | 1711 |

It has been found that by the addition of Ba $SO_4$ to other fillers a higher percentage of filler could be added. This is due to the low oil absorption of Ba $SO_4$, thereby allowing more filler to be introduced into the formula. This is due to the fact that since Ba $SO_4$ has a very low oil absorption value, it does not absorb or utilize much of available plasticizer, thereby making available this plasticizer for other fillers. Thus, if other fillers with higher oil absorption value were used not as much plasticizer would be available. Another exceptional phenomena secured by employing Ba $SO_4$ as the filler is that it has been found that not much resinous binder is required to hold the Ba $SO_4$ particles together. What physical forces are influenced in this type of cohesive action is not understood.

Example 6 has other virtues than just affording a dense viscoelastic mass when cured. This formula possessing antimony oxide with vinyl chloride resin as a filler affords a self-extinguishing (core material). With the growing demand of fire retardancy in the building materials, this formula is excellent. This formula also offers an excellent acoustical caulking compound; which is an important part of an overall acoustical system. The formula can be easily molded with the fingers. This acoustical putty-like or acoustical caulk compound offers the acoustical field a highly specialized and needed acoustical caulk for acoustical installation applications.

Thus, the present invention produces a very high quality structure having very excellent sound transmission loss characteristics.

The embodiments of the invention in which an exclusive property or privilege is claimed are defined as follows:

1. Process for the production of a solid structure of a high acoustical sound barrier which comprises adding to a mixer in parts by weight 205 parts of a plasticizer consisting of:
   170 parts of tricresyl phosphate
   120 parts of dioctyl phthalate
   120 parts of diiso-octyl phthlate
then adding slowly 400 parts of polyvinyl chloride, then adding 200 parts of a synthetic polymer of aromatic hydrocarbons $(CH_3)_2\ C_{10}H_5 — CH_2 — C_{10}H_4\ (CH_3)_2—CH_2 — C_{10}H_5\ (CH_3)_2$ average molecular weight 662, melting point 160 then adding 5,200 parts of barium sulfate, and then adding 205 additional parts of said plasticizer then curing the mixture in a curing chamber at a temperature in the range of 275° F. to 330° F. for a time period of 1 to 2 hours and at a pressure in the range from about 100 to 2,000 lbs./sq.in. and then affixing said cured mixture between two panels to produce said solid structure of a high acoustical sound barrier.

2. Process as defined by claim 1 wherein about 80 to 90 percent by weight of barium sulfate particles are distributed throughout said mixture.

3. Process as defined by claim 1, and extruding said mixture.

4. The process as set forth in claim 1 wherein said mixture is taken from the curing chamber through a die.

* * * * *